United States Patent [19]

Spatafora et al.

[11] Patent Number: 5,076,416

[45] Date of Patent: Dec. 31, 1991

[54] METHOD AND DEVICE FOR SUCCESSIVELY FEEDING FLAT PRODUCTS

[75] Inventors: Mario Spatafora; Antonio Gamberini, both of Bologna, Italy

[73] Assignee: G.D Societa' Per Azioni, Bologna, Italy

[21] Appl. No.: 566,264

[22] Filed: Aug. 13, 1990

Related U.S. Application Data

[63] Continuation-in-part of Ser. No. 357,359, May 26, 1989, abandoned.

[30] Foreign Application Priority Data

Sep. 14, 1989 [IT] Italy ............................. 3621 A/89

[51] Int. Cl.⁵ ............................................. B65G 47/24
[52] U.S. Cl. ...................................... 198/407; 198/663
[58] Field of Search ............... 198/406, 407, 412, 396, 198/663

[56] References Cited

U.S. PATENT DOCUMENTS

| 1,971,574 | 8/1934 | Moon | 414/798.5 |
|---|---|---|---|
| 2,085,339 | 6/1937 | Smith | 198/625 X |
| 2,104,657 | 1/1938 | Bombard | 414/798.5 |
| 2,828,888 | 4/1958 | Nicolle | 198/396 X |
| 3,107,455 | 10/1963 | Gloor et al. | 198/625 X |
| 3,337,064 | 8/1967 | Mojden et al. | 414/798.5 |
| 3,377,929 | 4/1968 | Ware et al. | 414/798.5 |
| 3,503,486 | 3/1970 | Alexander et al. | 414/798.5 X |
| 3,827,582 | 8/1974 | Lederer | 414/798.5 |
| 4,108,319 | 8/1978 | Kacirek et al. | 198/625 X |
| 4,391,560 | 7/1983 | Fardin | 198/406 |
| 4,625,499 | 12/1986 | Yamaguchi et al. | 53/542 |
| 4,760,910 | 8/1988 | Suzuki et al. | 198/412 |

FOREIGN PATENT DOCUMENTS

| 2122876 | 12/1971 | Fed. Rep. of Germany | 198/406 |
|---|---|---|---|
| 2219285 | 12/1989 | United Kingdom | 198/663 |

Primary Examiner—Joseph E. Valenza
Attorney, Agent, or Firm—Marshall, O'Toole, Gerstein, Murray & Bicknell

[57] ABSTRACT

A method and device for successively feeding flat products, i.e. flat slab-shaped products such as sweets or biscuits, into groups consisting of a number of products arranged on edge; whereby the products, laid flat, are fed successively on a conveyor to the input of a curved channel along which then are fed contacting one another, and from the output of which they are fed successively, in an inclined position, to a user device inside respective compartments of a conveyor defined by two counter-rotating screws, the pitch of which is gradually reduced for varying the inclination of the products and arranging the same on edge.

8 Claims, 3 Drawing Sheets

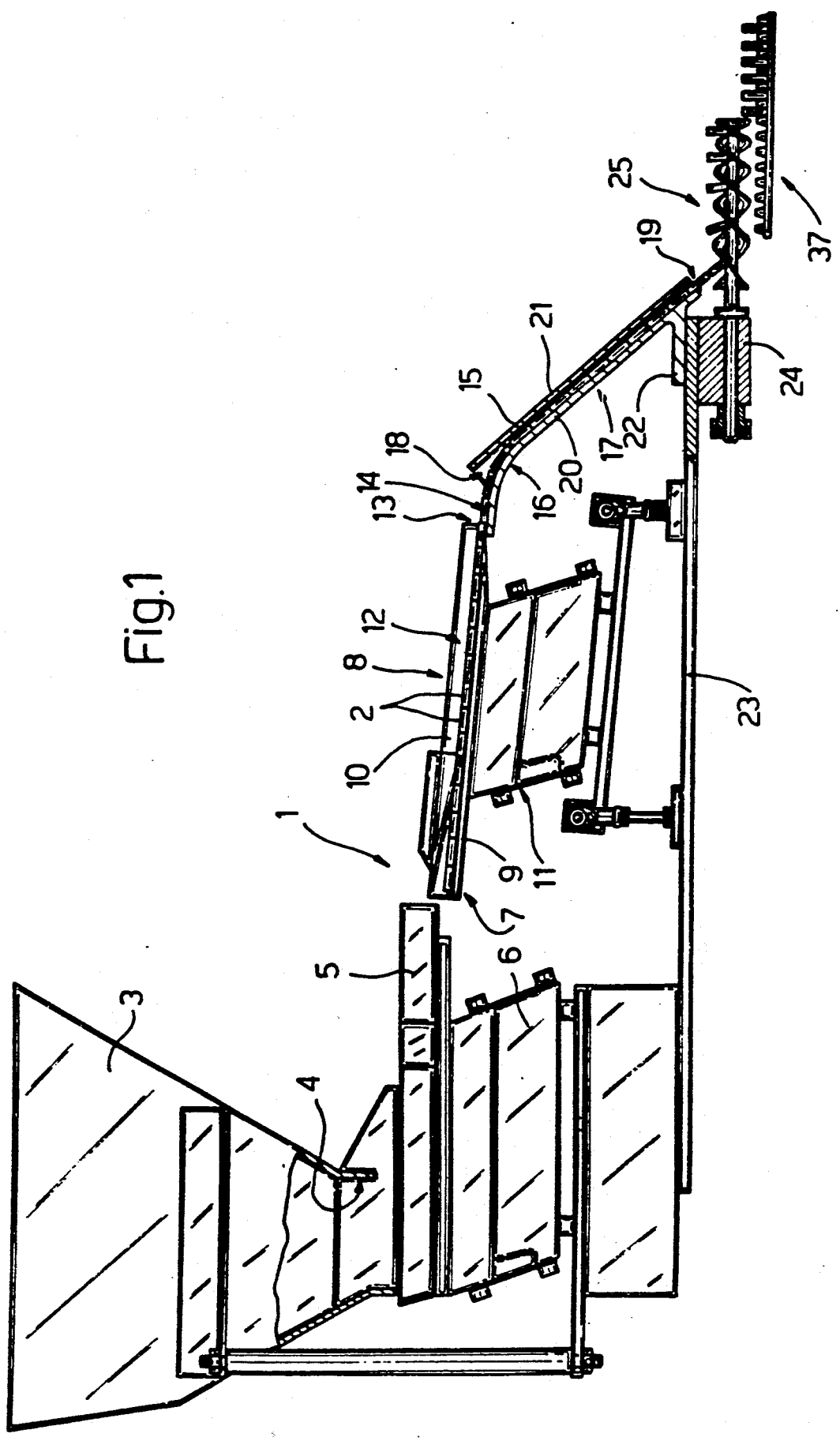

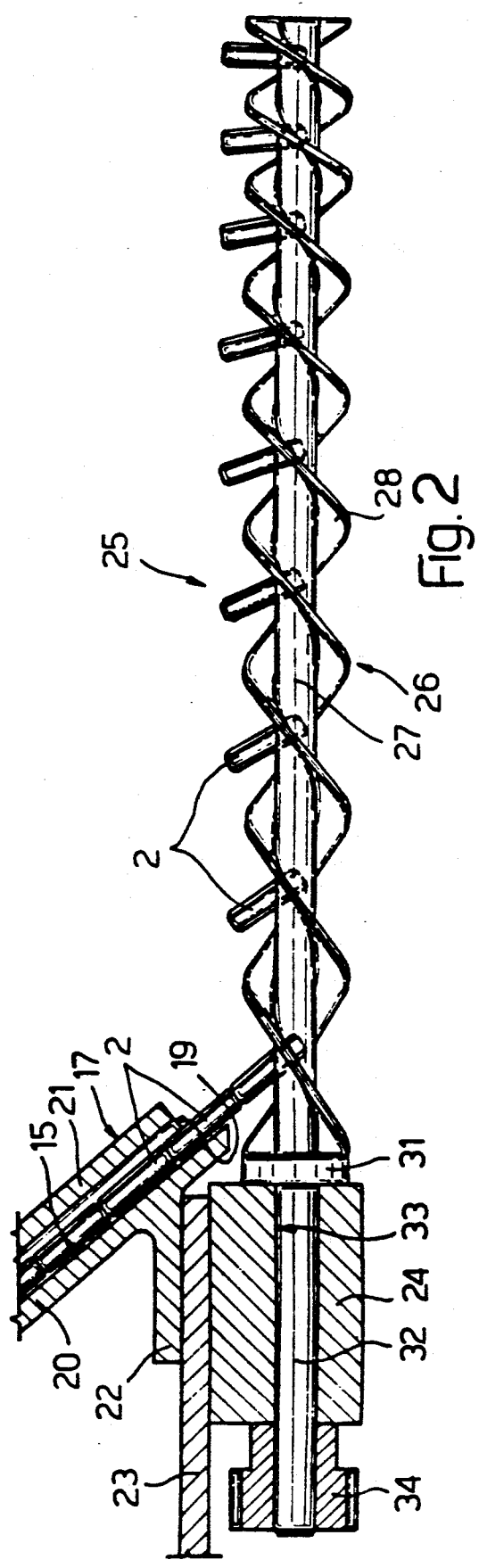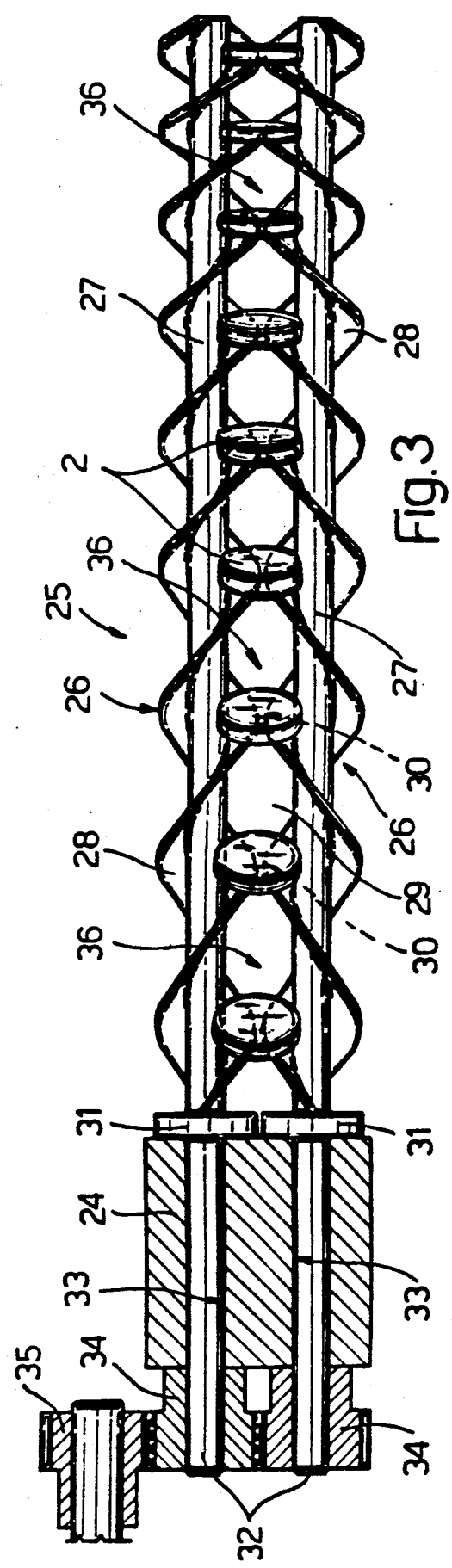

METHOD AND DEVICE FOR SUCCESSIVELY FEEDING FLAT PRODUCTS

This application is a continuation-in-part of out copending application Ser. No. 07/357,359 filed May 26, 1989.

BACKGROUND OF THE INVENTION

The present invention relates to a method for successively feeding flat products.

In particular, the present invention relates to a method for successively feeding flat products into groups consisting of a number of said products arranged on edge.

The present invention may be used to advantage in the food industry for forming groups of sweets, biscuits or similar products upstream from a packing machine. U.S. application Ser. No. 07/357,359, filed by the present applicants on May 26, 1979 and the content of which is fully incorporated herein, relates to a method and device for successively feeding slab-shaped products, such as sweets or biscuits, into groups consisting of a number of said products arranged on edge. According to said method and device, the products, laid flat, are fed successively on a conveyor to the input of a curved channel extending downwards over an arc of substantially 90° and down which the products drop in contact with one another. At the output of said curved channel, the products, arranged on edge, are maintained in this position and fed successively and separately to a user machine inside respective compartments of a conveyor defined by two tangent counter-rotating screws.

Though they provide for effectively feeding a succession of flat products to a user machine, the above known method and device present a number of functional drawbacks, foremost of which is that they fail to provide for feeding the products smoothly down the curved channel. As a result, the products are subjected to continual impact, possibly resulting in the formation of scraps, which may clog the channel or drop down the same together with the products and block the screw conveyor.

The reason for this is that, to feed the products on edge into respective compartments on the screw conveyor, the output end portion of the curved channel necessarily extends perpendicular to the conveyor, so that the leading product being inserted into the compartment bears the full weight of the products inside the channel until it is withdrawn. As the helical projections on the screws also defined the compartments laterally, it is not possible, especially when dealing with substantially round-section products, to employ screws with much larger outside diameters than the products. Consequently, the leading product, once inserted inside the compartment, projects upwards and outwards of the compartment by an amount practically equal to its radius, thus resulting in downward jolting and possible damage to the products inside the channel when it is withdrawn.

SUMMARY OF THE INVENTION

The aim of the present invention is to perfect the aforementioned known method and device, so as to overcome the aforementioned drawback.

With this aim in view, according to the present invention, there is provided a method for successively feeding flat products into groups consisting of a number of said products arranged on edge; said products, initially laid flat on a conveyor, being fed by said conveyor in a first traveling direction to the input of an output channel along which said products are fed successively and continuously, in contact with one another, and from the output of which they are extracted successively by an output conveyor and fed successively and separately by the same to a user device in a second traveling direction substantially parallel to said first direction; the position of each product, as it is transferred between said conveyor and said user device, being varied by an angle of substantially 90° so as to feed said products on edge to said user device; characterised by the fact that said change in position is achieved in two successive steps; a first change being effected by so curving said channel as to feed said products on to said output conveyor in an inclined position in relation to said second traveling direction; and a second change being effected by setting said products upright on said output conveyor so that they are arranged on edge and perpendicular to said second traveling direction.

According to the present invention, there is also provided a device for successively feeding flat products into groups consisting of a number of said products arranged on edge; said device comprising a conveyor designed to support said products, laid flat, and feed the same in a first traveling direction; an output conveyor designed to successively feed said products, separately and arranged on edge, to a user device in a second direction substantially parallel to said first direction; and an output channel having an input connected to said conveyor and an output connected to said output conveyor; characterised by the fact that said output is so oriented as to feed said products to said output conveyor in a third direction inclined in relation to said second direction; straightening means being provided on said output conveyor for arranging said products on edge and perpendicular to said second traveling direction.

BRIEF DESCRIPTION OF THE DRAWINGS

The present invention will be described by way of a non-limiting example with reference to the accompanying drawings, in which:

FIG. 1 shows a partially-sectioned schematic view of a preferred embodiment of a device for feeding and tilting flat products in accordance with the present invention;

FIG. 2 shows a side view of a detail in FIG. 1;

FIG. 3 shows a plan view of the FIG. 2 detail;

DETAILED DESCRIPTION OF THE INVENTION

Figure 4:
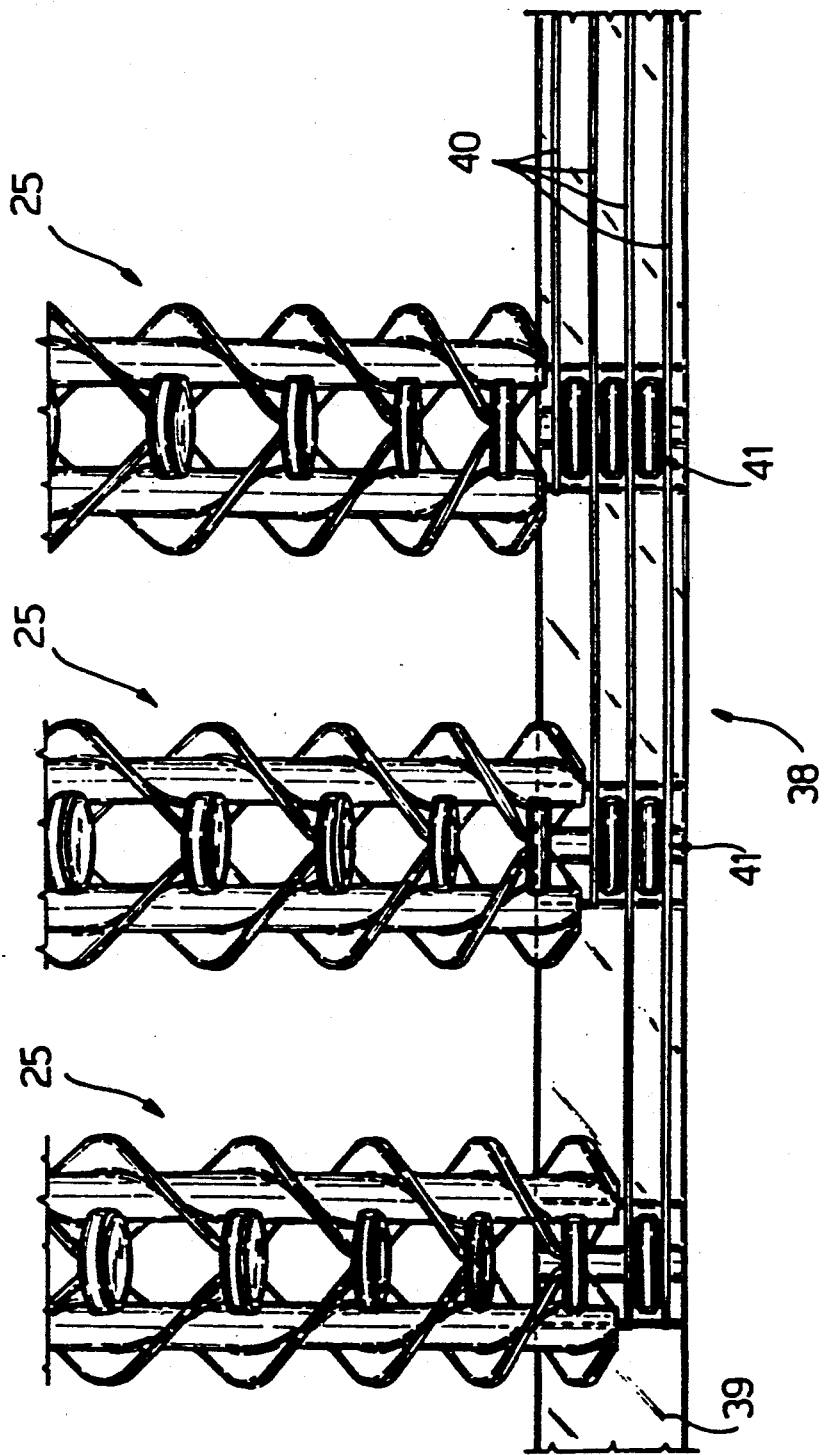
FIG. 4 shows a partial plan view of a series of FIG. 1 devices in a specific application.

Number 1 in FIG. 1 indicates a device for feeding and tilting flat products consisting, in the example shown, of round sweets 2.

Device 1 comprises an input feedbox 3, the outlet 4 of which feeds sweets 2 in bulk on to a surface or tray 5 supported substantially horizontally on a vibratory device 6 by which sweets 2, laid flat on the upper surface of tray 5, are fed to the output end of tray 5 located over the input end 7 of a vibratory conveyor 8. Conveyor 8 comprises a substantially flat upper surface or plate 9 sloping slightly downwards from input end 7, having two longitudinal top ribs 10 (only one of which is shown) and supported on a known vibratory device indicated as a whole by 11.

On top of plate 9, said ribs 10 define a feed channel 12 for sweets 2 laid face down and side by side in a continuous row. The output end 13 of channel 12 is located over a substantially horizontal input surface 14 of a channel 15 comprising a first downward-curving portion 16, and a second substantially straight portion 17 inclined at an acute angle. Portion 16 presents a substantially horizontal inlet 18 facing the output end 13 of channel 12 and designed to receive sweets 2 in the flat position, while portion 17 presents an outlet 19 inclcined at an acute angle (about 55° in the example shown) in relation to inlet 18.

Channel 15 constitutes a first tilting device for tilting sweets 2 from the flat position along channel 12 into the inclined position at outlet 19, and is defined by two curved plates 20 and 21. Plate 20 is located inwards and constitutes an extension of surface 14, while plate 21 is located outwards and connected integral with plate 20 via connecting means not shown. Plate 20 is integral with a bracket 22 connected to be 23 of device 1, beneath which is located a supporting block 24 for a pocket conveyor 25 extending beneath outlet 19 of channel 15, substantially parallel to channel 12.

As shown in FIG. 2 and particularly in FIG. 3, conveyor 25 is defined by two screws 26, each comprising a core 27 about which winds a helical projection 28 extending substantially radially outwards of core 27 by an amount less than the height of sweets 2. Cores 27 combine to define a channel 29 smaller in width than the diameter of sweets 2, while the outer edges of helical projections 28 are substantially tangent over a number of portions 30 distributed along conveyor 25 and having the same pitch as projections 28 on screws 26.

As shown in FIGS. 2 and 3, the pitch of screws 26 decreases gradually, and identically for both screws 26, from a maximum at the end facing outlet 19 to a minimum at the opposite end of screws 26.

As explained in more detail later on, by virtue of the variable pitch of screws 26, conveyor 25 constitutes a second tilting device for receiving sweets 2 in the inclined position at outlet 19 and gradually setting them on edge, perpendicular to the traveling direction along conveyor 25.

On the end facing block 24, each screw 26 presents a flange 31 from which, on the opposite side to that facing core 27, there extends a coaxial cylindrical shaft 32 mounted for rotation inside a hole 33 formed through block 24. The free end of each shaft 32 projecting from block 24 is fitted with a cylindrical gear 34 meshing with and turning in the opposite direction to the other gear 34 by virtue of a powered drive gear 35.

As shown in FIG. 3, along channel 29, each pair of adjacent, substantially tangent portions 30 defines a compartment 36 which, subsequent to counter-rotation of screws 26, moves at constant speed from the input end of conveyor 25, located beneath outlet 19 of channel 15, to the other end of conveyor 25.

In actual use, sweets 2, aligned contacting one another along channel 12, are fed successively, by virtue of vibrator 11 virbating plate 9, to inlet 18 of channel 15, along which they are fed, still contacting one another, to outlet 19 of channel 15 where, as already stated, they are tilted from the face-down position on plate 9 to an inclined position of approximately 55°. Sweets 2 are normally fed by gravity along channel 15, but provision may be made for a virbatory device (not shown) fitted to plate 20.

As shown in FIG. 1, on reaching outlet 19, each sweet 2 engages a respective compartment 36 on conveyor 25. In this connection, it should be noted that, beneath outlet 19, the pitch of screws 26 is such that the length of said compartment 36 is sufficient to enable sweet 2 to maintain, inside compartment 36, the same inclined position as at the outlet of channel 15. In particular, by virtue of its inclined position, each sweet 2, on entering respective compartment 36, presents its top end slightly higher than the top of projections 28. Consequently, when sweet 2 is withdrawn by conveyor 25, the next sweet 2 does not drop forward on to projections 28, by virtue of already being in substantial contact with the same. Moreover, by virtue of the counter-rotation of screws 26, projections 28 part gradually so as to enable the next sweet 2 to slip smoothly and stably inside compartment 36.

In other words, by virtue of the fact that each sweet 2 enters compartment 36 in an inclined position enabling immediate support of the next sweet 2 on projections 28, and the fact that each sweet 2 is eased gently down into compartment 36 by projections 28, the column of sweets 2 inside channel 15 is fed forward smoothly with no jolting which may result in partial crumbling of sweets 2 and consequent clogging of channel 15.

As regards channel 15, it should be pointed out that the inclined position and location of portion 17 to the rear of screws 26 enable any powder and/or scraps in channel 15 to be removed through openings (not shown) formed in plate 20, thus preventing conveyor 25 from clogging. As shown in FIG. 1, sweets 2 are supported on cores 27 and fed by conveyor 25 to a user device consisting of an input conveyor 37 to a packing machine (not shown). As sweets 2 are fed along conveyor 25, each compartment 36 is shortened gradually and substantially linearly by virtue of a similar reduction in the pitch of screws 26. Consequently, as sweets 2 approach conveyor 37, the distance between adjacent portions 30 is reduced, thus gradually increasing the inclination of sweets 2 in relation to the traveling direction along conveyor 25. The variation in the pitch of screws 26 is so calculated that, by the time they reach conveyor 37, sweets 2 are equally spaced and arranged perfectly on edge.

The fact that sweets 2 are equally spaced at the end of conveyor 25 is important in that it enables the formation of groups consisting of various combinations of sweets 2. As shown in FIG. 4, for example, using a series of devices 1 arranged side by side with conveyors 25 parallel, but with the output ends offset by a distance substantially equal to the thickness of sweet 2, groups 41 of different flavoured sweets may be formed on a user device consisting of a conveyor 38 extending crosswise in relation to conveyors 25 and consisting of a pocket type conveyor belt 39 beneath a number of fixed longitudinal blades 40.

Though employed herein for feeding and tilting sweets, device 1 may obviously be employed to advantage for feeding and tilting other flat products, such as biscuits, chocolate bars, packs of cigarettes, etc.

We claim:

1. A device for successively feeding flat products (2) into groups (41) consisting of a number of said products (2) arranged on edge, said device comprising:

a conveyor (9) designed to support said products (2), laid flat, and feed the same in a first traveling direction;

an output conveyor (25) designed to successively feed said products (2) separately and arranged on edge to a user device (37, 38) in a second direction inclined relative to the first direction;

means (28) on said output conveyor (25) for tilting said products (2) upwardly on edge and perpendicular to the second direction;

the output conveyor (25) comprising two counter-rotating screws (26);

each said screw (26) having a core (27) and an outer screw thread projection (28) shorter in height than said products (2) and wound about the core (27) to form a number of successive turns;

the cores (27) of said screws (26) being arranged at a distance from each other to support the said products and thereby prevent the said products (2) from passing downwardly between the cores;

corresponding pairs of successive turns of said outer projections (28) on the pairs of screws defining a respective compartment (36) for a respective said product (2); and guide means to smoothly guide said product from said output (19) to an initial position, inside said compartment (36), wherein each said flat product is supported by said cores (27), and is arranged in contact with said cores (27) and projections (28) at about the same slope as the inclined third direction.

2. A device as claimed in claim 1 wherein each said compartment (36) is of variable length in said second direction, said length being initially such as to support a respective product (2) inclined relative to the second direction substantially to the inclination of the third direction and gradually being reduced in length as the compartment (36) approaches the user device (47, 38) so as to tilt said product (2) on edge.

3. A device as claimed in claim 2 wherein the screw thread projections (28) of both said screws (26) present a pitch varying in the same manner.

4. A device as claimed in claim 3 wherein the pitch varies substantially linearly, and presents a maximum value at the output (19) of said output channel (15).

5. A device as claimed in claim 1 wherein the screw thread projections (28) of both said screws (26) present a pitch varying in the same manner.

6. A device as claimed in claim 5 wherein the pitch varies substantially linearly and presents a maximum value at the output (19) of said output channel (15).

7. A method for successively feeding flat products (2) into groups (41) consisting of a number of said products (2) arranged on edge, said products (2) initially being laid flat on a conveyor (9) comprising:

feeding said products (2) by said conveyor (9) in a first traveling direction into an input means (18) of an output channel (15);

feeding said products (2) successively and continuously in contact with one another through the output channel (15) to an output (19) and removing the products (2) in an inclined position from the output (19) one at a time but successively;

feeding the products (2) in said inclined position one at a time to an output conveyor (25) having a product receiving and transporting compartment (36);

the output conveyor (25) comprising two counter-rotating screws (26); each said screw (26) having a core (27) and an outer screw thread projection wound about the core (27) to form a number of successive turns; the cores (27) of said screws (26) being arranged at a distance from each other to support the said products and thereby prevent the said products (2) from passing downwardly between the cores; corresponding pairs of successive turns of said outer projections (28) on the pairs of screws defining a respective compartment (36) for a respective said product (2);

depositing the products (2) one at a time and spaced apart in the product receiving and transporting compartment (36) which is inclined to and does receive the products (2) approximately in the inclined position they have when removed from the output (19) so that each said flat product is supported by said cores (27), and is arranged in contact with said cores (27) and projections (28); and simultaneously transporting the products (2) in spaced apart position on the output conveyor (25) to a user device (37, 38) while progressively tilting the products (2) from their initial inclined position to a position at which they are set on edge in a vertical position lateral to the direction of travel of the output conveyor (25).

8. A method according to claim 7 in which:

the products are transported along the compartment (36) defined by the output conveyor (25) having an initial length enabling support of a respective said product (2) in said inclined position and with the length of the compartment being reduced as said compartment (36) approaches the user device (37, 38) to thereby tilt each product (2) on edge.

* * * * *